(12) United States Patent
Yu

(10) Patent No.: US 7,623,998 B1
(45) Date of Patent: Nov. 24, 2009

(54) SYSTEM AND METHOD FOR IDENTIFYING BEZIER CURVES FROM A SHAPE

(75) Inventor: Fan Yu, Palo Alto, CA (US)

(73) Assignee: Adobe Systems, Inc., San Jose, CA (US)

( * ) Notice: Subject to any disclaimer, the term of this patent is extended or adjusted under 35 U.S.C. 154(b) by 623 days.

(21) Appl. No.: 11/429,381

(22) Filed: May 5, 2006

Related U.S. Application Data

(60) Provisional application No. 60/778,541, filed on Mar. 1, 2006.

(51) Int. Cl.
*G06F 17/50* (2006.01)
*G06T 17/20* (2006.01)
(52) U.S. Cl. .................. 703/2; 703/6; 345/423
(58) Field of Classification Search .......... 703/2, 703/6; 345/423; 382/260
See application file for complete search history.

(56) References Cited

U.S. PATENT DOCUMENTS

| 5,448,687 | A | * | 9/1995 | Hoogerhyde et al. | ......... 345/423 |
| 5,999,188 | A | * | 12/1999 | Kumar et al. | ............... 345/423 |
| 2003/0025713 | A1 | * | 2/2003 | Wang et al. | ................. 345/611 |
| 2005/0169552 | A1 | * | 8/2005 | Silverbrook et al. | ........ 382/260 |

* cited by examiner

*Primary Examiner*—Thai Phan
(74) *Attorney, Agent, or Firm*—Fish & Richardson P.C.

(57) ABSTRACT

A system and method receives a set of data points and identifies one or more Bezier curves corresponding to the set of data points. The system and method uses different techniques for identifying the Bezier curve depending on whether a Bezier point is a sharp point, in which the slope of the lines on either side of the point differ by a threshold amount or another type of point.

31 Claims, 5 Drawing Sheets

SYSTEM AND METHOD FOR IDENTIFYING BEZIER CURVES FROM A SHAPE

CROSS REFERENCE TO RELATED APPLICATION

This application claims the benefit U.S. Provisional Patent Application Ser. No. 60/778,541 Entitled, "System and Method for Identifying Bezier Curves from a Shape" filed by Fan Yu on Mar. 1, 2006, having the same assignee as the present application, and is hereby incorporated by reference in its entirety.

FIELD OF THE INVENTION

The present invention is related to computer software and more specifically to computer software for graphics.

BACKGROUND OF THE INVENTION

Some users use computer systems to draw shapes. When a user uses a computer system to draw shapes, the computer system receives from a pointing device the coordinates of discrete points in the path the user used to draw the shape. The path defined by such points is rarely as smooth as the user wishes it, and the points may not have a uniform spacing between them. However, the user will want the computer system to take the points it receives on the irregular path provided by the user and create a smooth path to create the intended shape. Thus, it can be said that the user wants the computer system to provide an accurate interpretation of what the user intended, not what the user actually provided.

To reduce the amount of data required to represent the shape, conventional computer programs that perform such functions may employ Bezier curves to represent the shapes that represent what the computer system interpreted to be the shapes intended by the user. The shape provided by the user is broken down into Bezier curves defined between two Bezier points with eight parameters. However, because the user's intended shapes could frequently be irregular, such computer systems were required to make a trade off when representing the user-intended shapes using Bezier curves. Either the computer system could represent the curve or shape using a large number of Bezier points or a small number of Bezier points. The larger the number of Bezier points, the closer the shape could be to what the user actually intended, but the larger number of points generated large file sizes that were time-consuming to transfer over a network such as the Internet. Thus, the computer system or the user had to make a choice between a large file size and curves or shapes that accurately represented what the user had intended.

What is needed is a system and method that can accurately represent an intended curve or shape without an unnecessarily large number of Bezier points.

SUMMARY OF INVENTION

A system and method receives the coordinates of a path traced by a user using a pointing device, such as mouse, or another input device. The system and method normalizes the data to its own coordinate system using the screen pixel as a unit of measure. For example, a data point 3 units from the left edge of the screen and another data point 7 units from the left edge could be normalized to 1 pixel and 2 screen pixels, respectively. The system and method identifies "sharp points" from the shape. A "sharp point" is point for which the average slope of the line for each of a few data points to one side of the data point is different by a certain threshold from the average slope of the line each of a few data points to the other side of the data point. The system and method also identifies "local extrema" points from the path. "Local extrema" points are local low points, local high points, local left points and local right points. For example, a local low point is a point for which several data points on either side are higher than the pixel. The sharp points and local extrema points will be the initial Bezier points of the shape or curve. The system and method identifies one or two extra points between each pair of adjacent Bezier points. If either of the pair of Bezier points is a non-sharp point, then the system and method identifies a midpoint between the two non-sharp Bezier points. The midpoint may be the data point that is one half the number of data points between the two Bezier points, or the midpoint may be the closest data point to half the distance on the path along all of the data points between the two Bezier points. One of the Bezier points is assigned at value equal to zero, the other is assigned at value equal to 1, and the midpoint is assigned at value equal to ½, for use as described below. If both of the pair of Bezier points are sharp points, the system and method identifies two points between them, using either of the same two techniques described above, except that instead of being halfway between the two Bezier points, the two midpoints are such that the distance from the first Bezier point to the first between point is the equal to the distance from the second between point to the second Bezier point. Again, the two Bezier points are assigned at value equal to 0 and 1, with the points between them assigned t values equal to their distance along the path, such as ⅓ and ⅔ or ¼ and ¾. The system and method then uses the X,Y coordinates of the three data points and the slope of one of the non-sharp Bezier points, or the X,Y coordinates of the four data points, if both Bezier points are sharp, to identify an $a_x$, $b_x$, $c_x$, and $d_x$ that most closely fits the following equations, for each point between the two Bezier points: $x=a_xt^3+b_xt^2+c_xt+d_x$; $y=a_yt^3+b_yt^2+c_yt+d_y$. The system and method then uses the $a_x$, $b_x$, $c_x$, $d_x$ and the X and Y coordinates for each of the pair of Bezier points to define the Bezier curve between each two Bezier points. The system and method then tests the points on the Bezier curve defined by the a, b, c, d, and each X and Y of the two Bezier points to determine whether a distance between each of the received data points and the nearest point on the Bezier curve exceeds a threshold. If not, the system and method then selects the second Bezier point and the next adjacent Bezier point and repeats the process described herein. If the threshold, which may be configurable by the user, is exceeded, the system and method selects a midpoint between the two selected Bezier points and assigns that point as another Bezier point. The point is referred to as a "curve point", but is treated as if it were a local extrema point. The first of the two selected Bezier points and the curve point are selected, the midpoint is identified between them and the system and method then repeats the process described above for these two points. At the time the difference is identified, if the threshold is again exceeded, the system and method again selects a new curve point at the midpoint and repeats the process, as many times as needed to cause the threshold not to be exceeded.

DETAILED DESCRIPTION OF A PREFERRED EMBODIMENT

Figure 1:
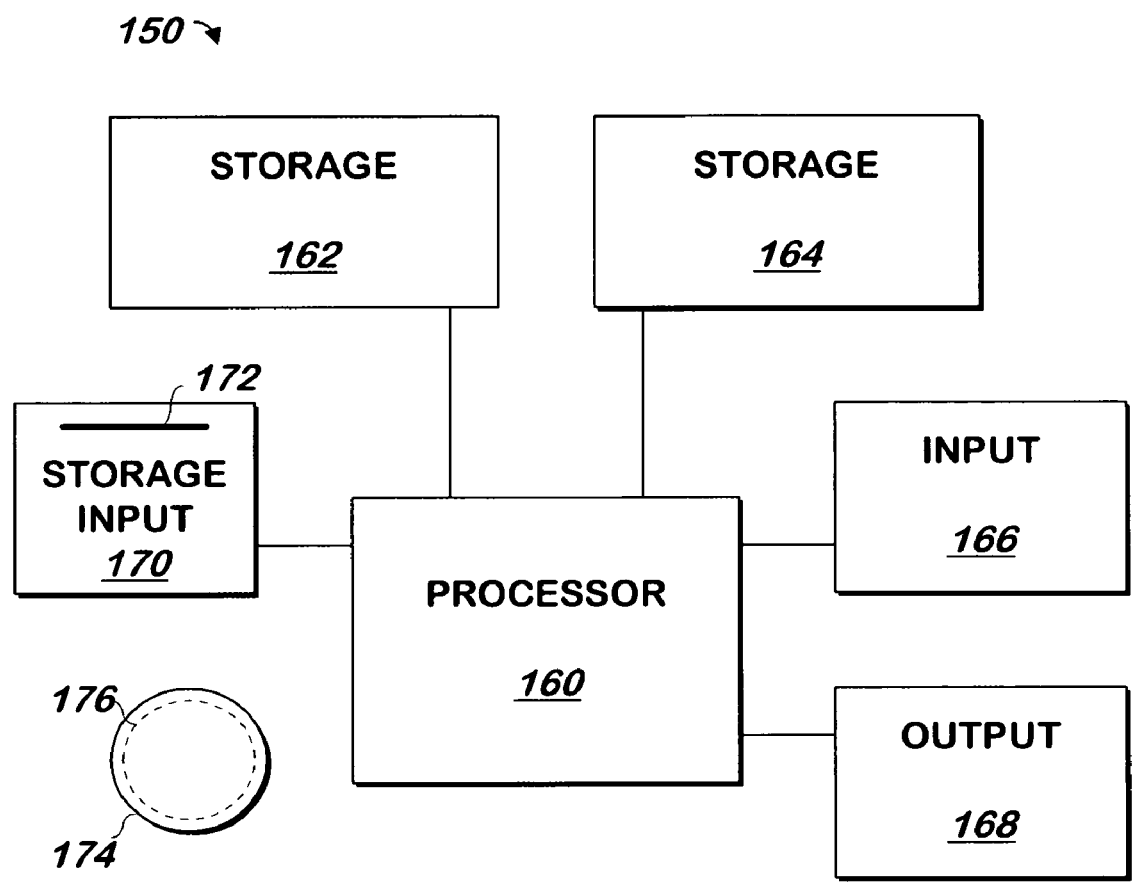
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Referring now to FIG. 2, a method of identifying Bezier curves from a shape is shown according to one embodiment of the present invention.

Receive Data Points

The coordinates of a shape, for example, formed as the path traced using a pointing device, are received 210. In one embodiment, the coordinates are received as an X coordinate and a Y coordinate, for example, using the upper left-hand corner of the computer screen or window in which the application the points are being received as the origin (0,0) of the coordinate plane. In one embodiment, step 210 includes assigning each point of the given path an index number (e.g. 0, 1, 2) which denotes its place in the sequence of points in the order received.

Normalize Data Points

In one embodiment, the coordinates of all data points are normalized 212 to a different coordinate system using a pixel as a unit of measure to produce, for each data point, a normalized data point. For example, if the X coordinates of the shape are given to the accuracy of 5000 points, but the resolution of the screen on which the shape is to be displayed will be limited to 1024 pixels, then the coordinates received by the system are converted to coordinates that will fit the display capability of the screen. In such an instance, two or more adjacent points may be mapped onto the same pixel in the new coordinate system with no loss of displayable information.

Identify Sharp Points and Local Extrema Points

Using the normalized data points, "sharp points" and "local extrema points" are identified and marked as Bezier points in steps 214-230, as will be described below. "Sharp points" are points in which the average slope of the lines between a selected data points and each of a few normalized data points nearby and to one side of the normalized data point is different by a threshold from the average slope of the lines between the selected data point and each of a few normalized data points on the other side of the normalized data point. "Local extrema points" are local low points, local high points, local left points and local right points. For example, a local low point is a point for which several normalized data points nearby and on both sides of the normalized data point are higher than the normalized data point. In one embodiment, a data point for which the slope is not properly defined on either side of the selected data point, such as the first and last normalized data points in a shape, is marked as a sharp point and as a Bezier point as described in more detail below. The identification of sharp points and local extrema points, each of which are Bezier points, will now be described.

Identify Sharp Points

At step 214 the first normalized data point (e.g. the one with index 0) is selected. The average slope of the lines between the selected normalized data point and a each of a few normalized data points over to one side of the selected data point is compared to the average slope of the lines between the selected data point and each of a few normalized data points over to the other side of the selected data point 216. The angle between the slopes is calculated and compared to a threshold angle in order to determine whether the selected data point is a sharp point 216. If the angle between the slopes is less than the threshold angle 218, then the selected data point is marked as a Bezier point and as a sharp point 220, and the method continues at step 228. For example, the average of the slopes calculated at 2, 3, 4, and 5 data points from the selected data point on one side, may be compared to the average of the slopes calculated at the same number of data points on the other side of the selected data point 216. In one embodiment, if the angle between the slopes on opposite sides of the selected data point is less than a certain threshold angle, for example ninety degrees, indicating a significant change in the shape of the normalized data points at that selected data point, then the selected data point is identified as a sharp point and a Bezier point 218, and the method continues at step 228. In one embodiment, the angle is identified using the smallest number, so, for example, a measurement of 281 degrees is replaced by a measurement of 89 degrees.

In one embodiment, if there is at least one normalized data point on either side of the selected normalized data point, but there do not exist enough normalized data points to sufficiently calculate the average slopes up to certain number of data points on either side of the selected data point, for example the second data point from the end of a line, the selected point may not be identified as a sharp point. However, in one embodiment, the end of a shape may be identified as continuous with other parts of the shape if the end of the shape is within a threshold distance of another portion of the shape. For example, a circle may be treated as continuous for the purpose of identifying a sharp point. In this case, the first and last data points are not automatically sharp and the nearby points may be used to identify whether the end points are sharp. As noted, an end of a line that is not near another portion of the shape may be identified as a sharp point.

Identify Local Extrema Points

If the angle between the average of the slopes is not less than the threshold angle 218, then the coordinates of the selected normalized data point are compared to the coordinates of the nearby normalized data points, in order to determine if the selected normalized data point is a local extrema point 222. If the selected normalized data point is determined not to be a local extrema point, the method continues at step 228.

In one embodiment, to determine whether the selected data point is a local extrema point, the X coordinate of the selected normalized data point is compared with the X coordinates of several normalized data points nearby and on either side of the selected data point, and the Y coordinate of the selected normalized data point is compared with the Y coordinates of several normalized data points on either side of the selected normalized data point 222. If all of the X coordinates of several data points nearby and on both sides of the selected normalized data point are higher, or all are lower, than the X coordinate of the selected data point, then the selected data point is identified 224 as a local extrema point and marked 226 as a Bezier point. Additionally, as part of step 226, the selected data point is also marked as a "vertical slope point," and the method continues at step 228. "Vertical slope points" are specifically local left points and local right points.

Similarly, if all of the Y coordinates of several data points nearby and on both sides of the selected data point are higher, or all are lower, than the Y coordinate of the selected data point, then the selected data point is identified 224 as a local extrema point and marked 226 as a Bezier point, though not marked as a vertical slope point, before the method continues at step 228. For example, a point is found to be a local low point if several nearby data points on both sides of the selected data point have higher Y coordinate values than the Y coordinate of the selected; hence, this selected data point is identified 224 as a local extrema point, marked 226 as a Bezier point. However, this selected data point is not marked 226 as a vertical slope point; thus, its existence as a horizontal slope point is implied. After the selected normalized data point has been investigated and optionally marked as described above, the method continues at step 228.

Check for More Data Points

At step 228, a determination is made whether or not there remain any more normalized data points in the system with a higher index than those that have been processed as described above which have yet to be selected and investigated as described above. In one embodiment, if the current selected data point has the highest index, making it the last normalized data point in the system, then it is marked as Bezier point and as a sharp point 220 (unless it is continuous with another part of the shape as described above), and the method continues at step 240; otherwise, the method continues at step 230.

Select Next Data Point

At step 230, a new normalized data point with a higher index is selected, and the method continues at step 216 using the newly selected normalized data point.

Select First Bezier Point

At this point, all of the sharp points and the local extrema points have been identified and marked as sharp points and Bezier points accordingly, and the first such Bezier point (e.g. the one with the lowest index), is selected 240. As noted above, the first normalized data point may be selected as the first Bezier point 240.

Identify the Next Bezier Point

Using the selected Bezier point, the next Bezier point in the order of the points received is identified 242. In one embodiment, the next Bezier point is identified as the Bezier point with the closest index that is greater than the index of the selected Bezier point, unless the shape is continuous, and the selected Bezier point is the last Bezier point, in which case the next Bezier point will be the nearest point with the smallest combination of distance and slope from the Bezier point prior to the selected Bezier point 242.

Identify Number of Between Points

Using the selected Bezier point and the next Bezier point, a number of "between points" is determined by identifying whether both the selected Bezier point and the next Bezier point are sharp points 244. If the selected Bezier point and the next Bezier point are both sharp points 244, then two "between points" are identified 246 as described below, and the method continues at step 248. If the selected Bezier point, or the next Bezier point, or both, are not sharp points 244, then one "between point" is identified 256, as described below, and the method continues at step 256.

Identify One Between Point

In one embodiment, a "between point" is a normalized data point lying between the selected Bezier point and the next Bezier point, and it is determined in the manner described below. A single between point is identified 256 as the midpoint between two adjacent Bezier points. In one embodiment, the between point is identified as either the normalized data point with an index that is the average of the indices of the selected Bezier point and the next Bezier point, and in another embodiment, the between point is the normalized data point which lies half the distance along the path between the selected Bezier point and the next Bezier point 256. In one embodiment, if the average of the indices is found not to be a whole number, then the fraction is rounded either up or down to the nearest integer, and the between point is identified as the normalized data point which has the rounded whole number as its index. In one embodiment, the distance midpoint is determined by summing up the distances between each pair of consecutive normalized data points along the path from the selected Bezier point to the next Bezier point. The total distance is calculated, and the between point is identified 256 as the normalized data point for which the distance from the selected Bezier point to the normalized data point is most closely equal to the distance between the normalized data point and the next Bezier point. Other methods of identifying a between point may be used as long as the point is between the selected Bezier point and the next Bezier point, each identified as described above.

Identify Two Between Points

If the selected Bezier point and the next Bezier point are both sharp points 244, then two between points are identified 246. In one embodiment, the steps for identifying two between points are similar to the steps for finding a single between point, as described above, except that instead of one midpoint halfway between the selected Bezier point and the next Bezier point, the two midpoints are identified such that the difference in index or distance from the selected Bezier point to the first between point is equal to the difference in index or distance from the second between point t the next Bezier point 246. For example, two between points may be identified such that the first is ⅓ of the way along the path between the two Bezier points, and the second between point is ⅔ of the way along the same path, though ¼ and ¾ between points may also be used, as well as other similar points. Other methods of identifying between points may also be used. After the two between points have been identified, the method continues at step 248.

Generate Equations

At step 248, a system of equations is generated using the normalized X and Y coordinates of the selected Bezier point, the between point or points and the next Bezier point. In one embodiment at value is assigned to each of these three or four normalized data points 248: the selected Bezier point is assigned at value of 0, the next Bezier point is assigned at value of 1, and between points are assigned a value between 0 and 1 corresponding to their distances or indices. If only one between point was identified in step 256, then it is assigned a value of F. If two between points were identified in step 246, then the two points are assigned t values corresponding to the distance or proportion of indices from the selected Bezier point to the next Bezier point. For example, two between points at ⅓ and ⅔ the distance between the selected Bezier point and the next Bezier point might be assigned t values such that the t value of the first between point is ⅓ and the t value of the second between point is ⅔.

Figure 4:
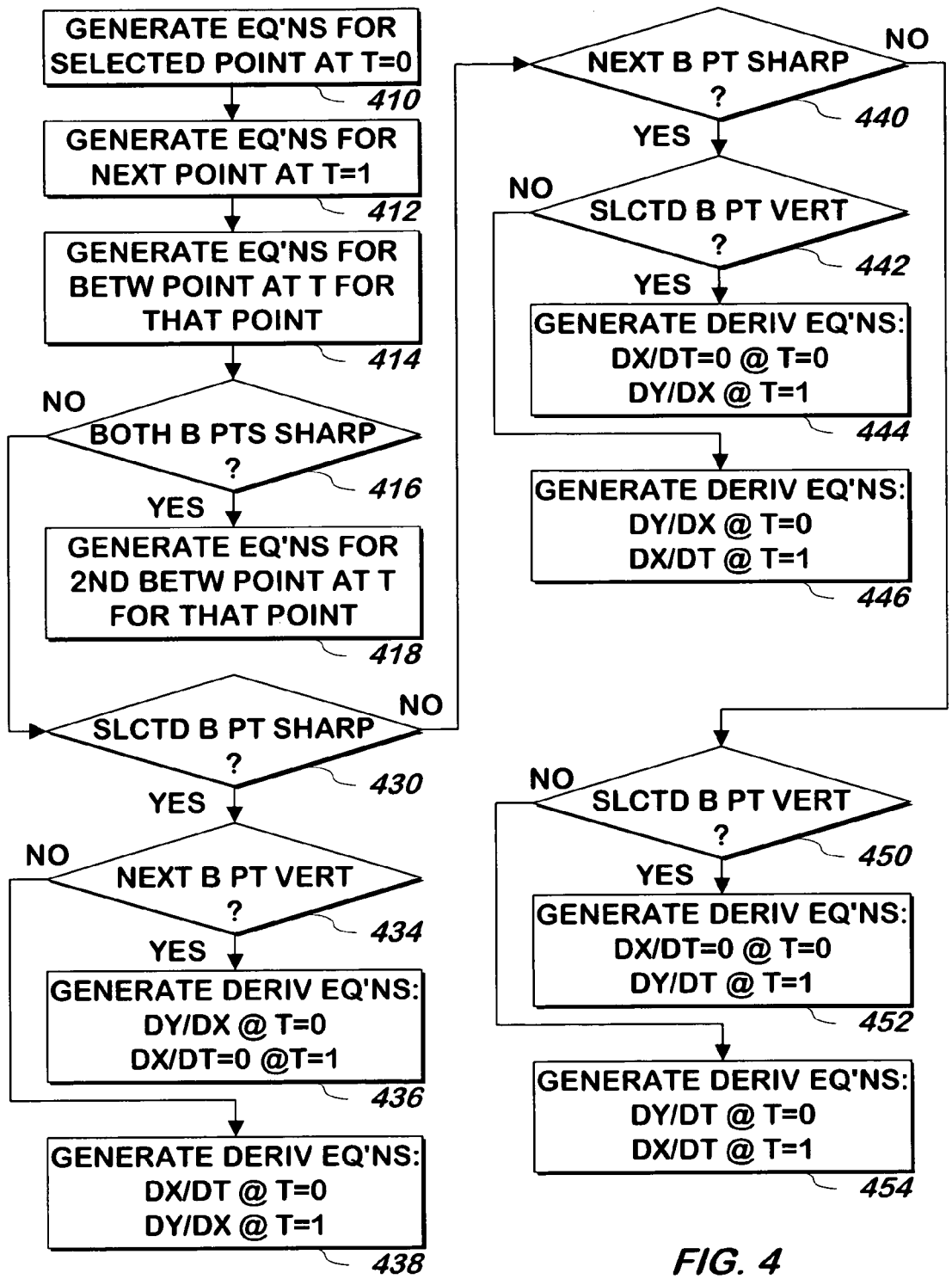
FIG. 4 is a flowchart illustrating a method of generating a system of equations according to one embodiment of the present invention.

Referring now to FIG. 4, a method of generating equations is shown according to one embodiment of the present invention. The steps of FIG. 4 are used to perform step 248 of FIG. 2 in one embodiment of the present invention. In one embodiment, six equations are generated using the X and Y coordinates and corresponding t values of the selected Bezier point, the first between point and the next Bezier point so that at each point, $x=a_x t^3+b_x t^2+c_x t+d_x$ and $y=a_y t^3+b_y t^2+c_y t+d_y$, where x is the X coordinate of the given normalized data point, y is the Y coordinate of the given normalized data point and t is a value between 0 and 1, inclusive, assigned to the normalized data point as described in the manner above. Two equations (one for X and one for Y) are generated 410 for the selected Bezier point, as described above, for t=0. Two equations for the next Bezier point are generated 412 as described above for t=1, and two equations for the first (or, only) between point are generated 414 as described above with the t value corresponding to that point. If both the selected Bezier point and the next Bezier point are sharp 416, indicating that two between points were identified in step 246, then two additional equations are generated 418 for the second between point, in the same manner as above, to complete a system of eight equations and eight variables, and the method continues at step 250 in FIG. 2A.

However, if either the selected Bezier point or the next Bezier point is not sharp 416, indicating that only one between point was identified in step 256, then two derivative equations are generated, one at each Bezier point (the selected Bezier point and the next Bezier point), as $dx/dt=3a_x t^2+2b_x t+c_x$ and as $d_y/d_t=3a_y t^2+2b_y t+c_y$, which are the derivative equations, with respect to t, of the equations described above, or $dy/d_x$, which is dy/dt above, divided by dx/dt above. In one embodiment, the values for t, dx/dt and dy/d$_x$, as well as the selection of the Bezier point for which each derivative equation is generated, are determined by the characteristics of the selected Bezier point and the next Bezier point, as described below.

If the selected Bezier point is sharp 430 and the next Bezier point is a vertical slope point 434, then two derivative equations are generated 436 such that for the next Bezier point, the value of dx/dt in the equation above is the horizontal component of the slope at the next Bezier point (in this case 0 because the next Bezier point is a vertical slope point), and in the equation, t is equal to 0, and for the selected Bezier point, the value generated in the equation above dy/dx is the slope at the selected Bezier point (on the side towards the next Bezier point). If the selected Bezier point is sharp 430, but the next Bezier point is not a vertical slope point 434, then the two derivative equations described above are generated 438 such that for the next Bezier point, the value of dx/dt in the equation above is the horizontal component of the slope at the next Bezier point, and in that equation, t is equal to 1, and the value of dy/dx in the equation above is the slope of the selected Bezier point (on the side towards the next Bezier point) with a value of t=0 in the equation. The slope of the tangent line at a sharp point may have a different value depending on from which side the sharp point is being approached when the slope is calculated; in one embodiment, the slope used to generate the equations, described above, will be identified as the slope that is calculated by approaching the sharp point from the direction of the other Bezier point of the two points: the selected Bezier point and the next Bezier point.

If the selected Bezier point is not sharp 430, a determination is made whether the next Bezier point is a sharp point 440. If the next Bezier point is sharp 440, and the selected Bezier point is a vertical slope point 442, then the derivative equations are generated 444 such that for the selected Bezier point, the value of dx/dt is the horizontal component of the slope at the selected Bezier point (in this case 0 because the selected Bezier point is a vertical slope point), and, in that equation, t is equal to 0, and for the next Bezier point, the value of dy/dx is the slope at the selected Bezier point (towards the next Bezier point), and in that equation, t=1. If next Bezier point is sharp 440, and the selected Bezier point is not a vertical slope point 442, then the equations are generated 446 such that for the selected Bezier point, the value of dy/dx is the slope of the selected Bezier point (towards the next Bezier point) with t=0, and for the next Bezier point, the value of dx/dt is the horizontal component of the selected Bezier point, and in that equation, t=1.

If the selected Bezier point is not sharp 430, and the next Bezier point is not sharp 440, then a determination is made 450 whether the selected Bezier point is a vertical slope point. If the selected Bezier point is a vertical slope point 450, the derivative equations are generated 452 in a manner at least similar to step 444. If the selected Bezier point is not a vertical slope point 450, then the derivative equations are generated 454 in a manner at least similar to step 446. It may be noted that, in one embodiment, if a Bezier point is neither a sharp point nor a vertical slope point, then that Bezier point is either a horizontal slope point (for which a the horizontal component of the slope of the tangent line at the Bezier point can be calculated) or a curve point, described above (for which both, or either, of the horizontal component or the vertical component of the slope of the tangent line at the Bezier point can be calculated).

When eight equations have been generated at one of steps 418, 436, 438, 444, 446, 452 or 454, the method continues at step 250 of FIG. 2.

Solve Equations and Associate Parameters

Referring again to FIG. 2, at step 250, the equations generated for the selected Bezier point, the between point(s) and the next Bezier point are solved for the coefficients $a_x$, $b_x$, $C_x$, $d_x$, $a_y$, $b_y$, $c_y$, and $d_y$ using conventional linear programming techniques, and the coefficients are associated with the selected Bezier point as the "parameters" of the selected Bezier point. The method continues at step 260 of FIG. 2B.

Check Accuracy of Bezier Curve

Figure 2A:
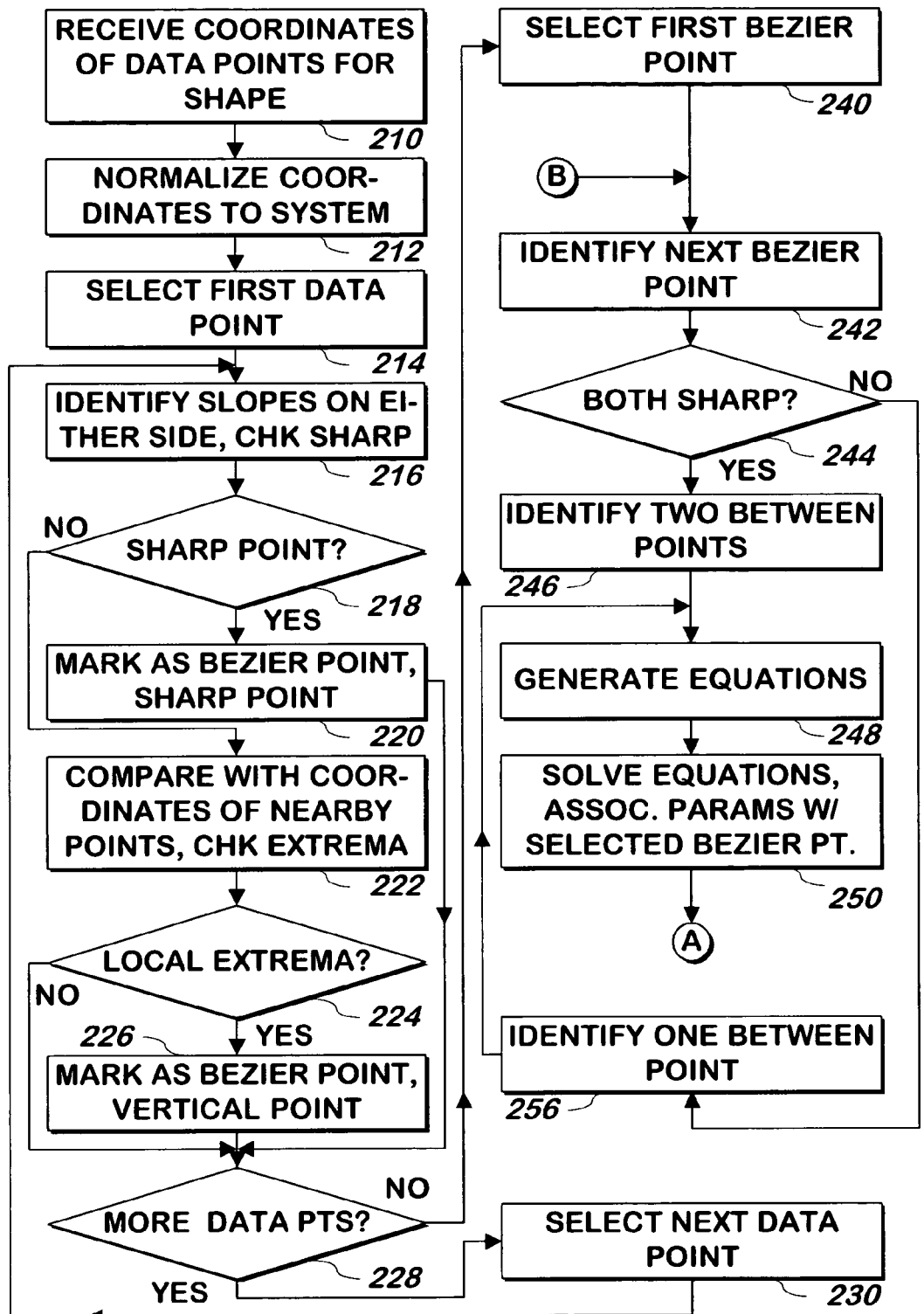
FIG. 2, consisting of FIGS. 2A and 2B, is a flowchart illustrating a method of identifying Bezier curves from a shape of data points according to one embodiment of the present invention.
Figure 2B:
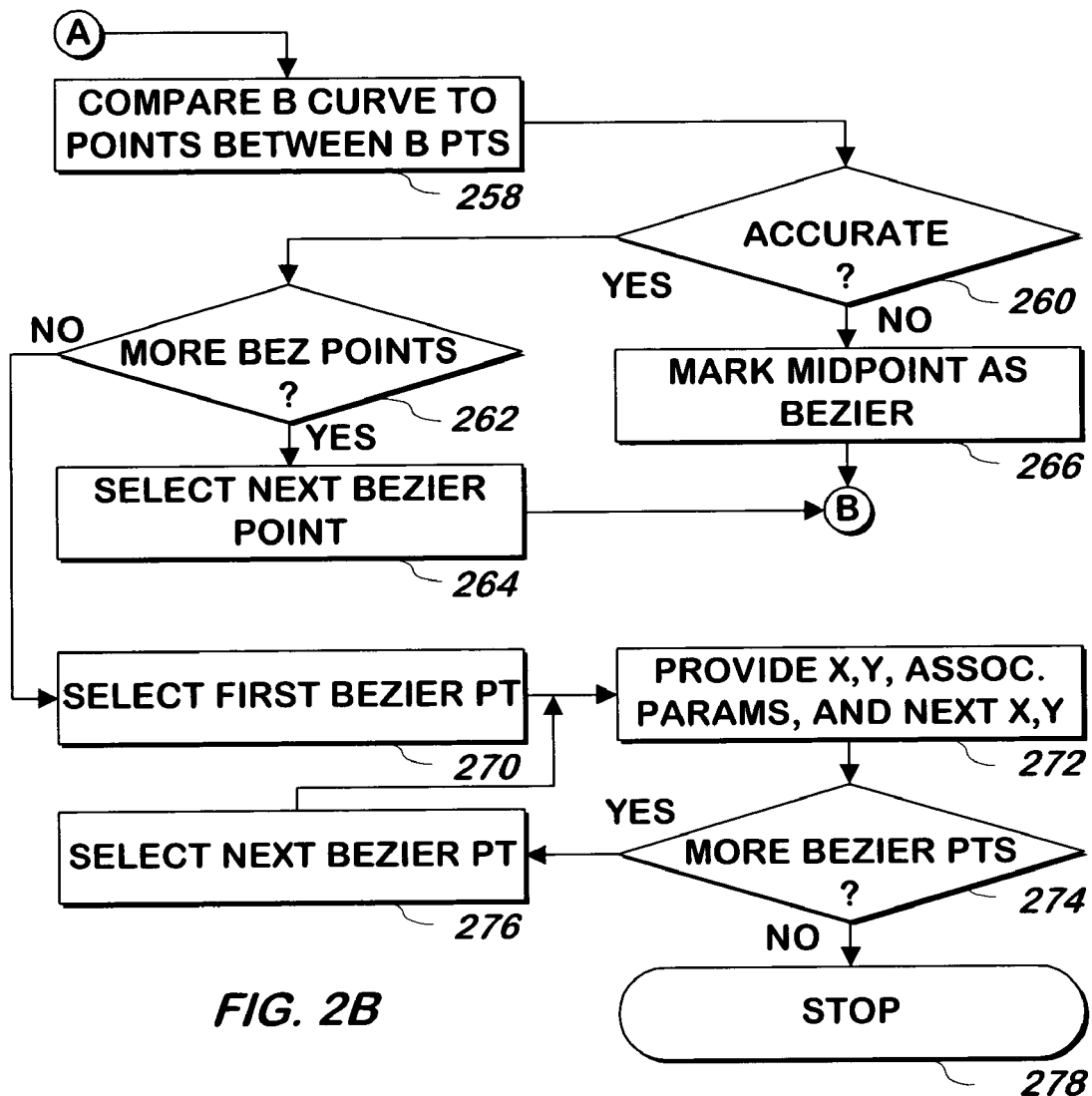

Referring now to FIG. 2B, once the parameters have been associated with the selected Bezier point, the newly found Bezier curve is checked 258 for accuracy. In one embodiment, to check the accuracy of the Bezier curve, the normalized data points from the index of the first Bezier point to the index of the next Bezier point are compared to the Bezier curve, and if the deviation between one or more normalized data points and the nearest point on the Bezier curve exceeds a threshold, the Bezier curve is determined to be inaccurate 260. In one embodiment, the deviation may be measured as the distance from each normalized data point to the nearest point on the Bezier curve, and if the distance between one or more normalized data points and the Bezier curve exceeds the threshold, the Bezier curve is determined to be inaccurate 260. In one embodiment, the threshold may be user selected, defaulting to a threshold value of a few pixels, such as two or three, with the curve being considered to be inaccurate if a single normalized data point is farther from the curve than this threshold. The user selection allows the user to make the tradeoff between speed and accuracy.

Mark Midpoint as Bezier Point

If the Bezier curve is not determined to be accurate as described above 260, a midpoint is identified as a "curve point", the "curve point" is marked as a Bezier point and the method continues at step 242 of FIG. 2A. When the method continues at step 242 of FIG. 2A, the "curve point" will identified as the next Bezier point. A "curve point" is a Bezier point that is neither a sharp point nor a local extrema point, and is treated as a non-vertical local extrema point. In one embodiment, the midpoint may be identified in a manner at least similar to the manner in which one between point is identified in step 256 of FIG. 2A, and the midpoint is marked only as a Bezier point, not as a sharp point or a local extrema point.

Check for More Bezier Points

If the Bezier curve is determined to be accurate 260, it is determined whether the next Bezier point identified as described above is the last Bezier point 262 of the normalized data points.

Select Next Bezier Point

If the next Bezier point is not the last Bezier point of the normalized data points 262, then the next Bezier point identified as described above is selected 264 as the new selected Bezier point, and the method continues at step 242 of FIG. 2A using the newly selected Bezier point.

Select First Bezier Point

If the next Bezier point is the last Bezier point 262, indicating that Bezier curves have been identified for all the normalized data points of the figure, the first Bezier point is selected 270 with its associated parameters.

Provide X and Y Coordinates with Associated Parameters

At step 272, the normalized X and Y coordinates of the selected Bezier point and the associated parameters for the selected Bezier point are provided, optionally, along with the X and Y coordinates of the next Bezier point. In one embodiment, the X and Y coordinates of the next Bezier point are not provided together with the X and Y coordinates of the selected Bezier point. Instead, the X and Y coordinates of the next Bezier point are taken from the coordinates supplied with that Bezier point, minimizing the amount of data required to recreate an approximation of a segment of the initial shape input by the user.

Check for More Bezier Points

If the next Bezier point in the system is the last Bezier point 274, then the method terminates at 278.

Select the Next Bezier Point

If the next Bezier point in the system is not the last Bezier point 274, then the next Bezier point is selected 276, and the method continues at from step 272, using the newly selected Bezier point.

System Description

Figure 3:
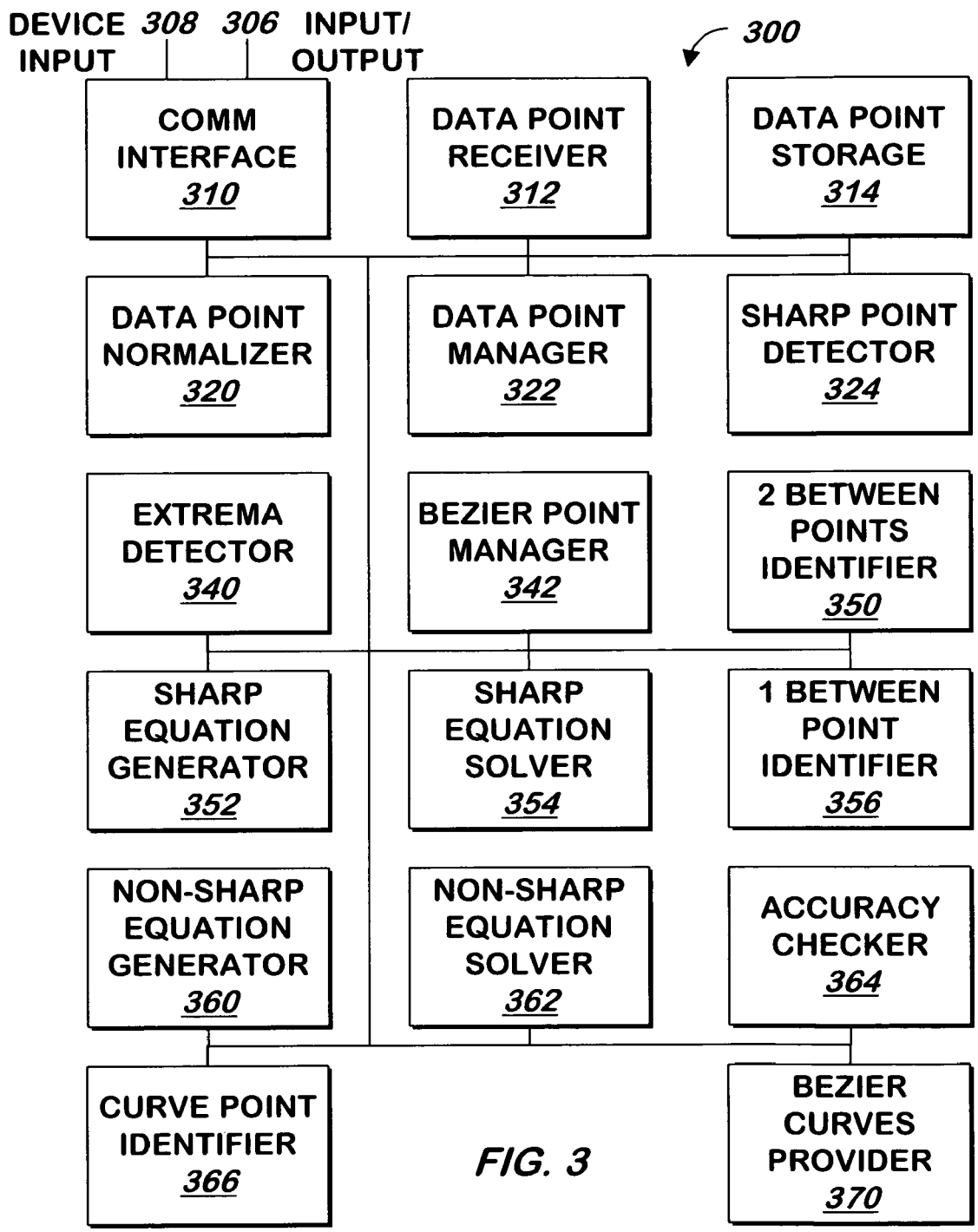
FIG. 3 is a system for identifying Bezier curves from a shape of data points according to one embodiment of the present invention.

Referring now to FIG. 3 a system for identifying Bezier curves from a shape of data points is shown according to one embodiment of the present invention Communication interface 310 receives the data points when a user enters a desired shape using an input device. In one embodiment, the user may manually trace the desired shape using a pointing device (not shown), such as a mouse. When communication interface 310 receives input from the input device (not shown), it sends data points to the data point receiver 312. For each data point received, data point receiver 312 increments the index, which it initializes to zero, and stores the X coordinate, the Y coordinate and the index as a data point record in data point storage 314 indexed by the index, for example, by storing it in an array. When communication interface 310 registers an event which signals an end point, such as an onMouseUp event, it signals to data point receiver 312 that there are no more incoming data points, and data point receiver 312 sends the index of the first data point to data point normalizer 320.

When data point normalizer 320 receives the index of the first data point, it normalizes each of the data points in the shape as described above, and adds the normalized x and y coordinates to the corresponding data point record in data point storage 314 for each indexed data point. When data point normalizer 320 has completed adding the normalized X and Y coordinates to the data point records in data point storage 314, it provides a pointer to data point record[0] in data point storage 314 to data point manager 322.

When data point manager 322 receives the pointer to record[0] from data point normalizer 320, it determines which data points are Bezier points. In one embodiment, data point manager 322 sends the pointer to the first data point record to sharp point detector 324 to cause it to determine which points are sharp points and Bezier points.

When sharp point detector 324 receives the index of the first data point record from data point manager 322, it identifies as described above, and marks, all sharp points as sharp points and as Bezier points in data point storage 314. In one embodiment, sharp point detector 324 initializes both a "sharp point" flag and a "Bezier point" flag in each data point record to false for each data point in data point storage 314. Sharp point detector 324 then scans the data point records in the order received, starting with the record corresponding to the pointer it received from data point manager 322, to determine if a data point record corresponds to a sharp point as described above. When sharp point detector 324 identifies a sharp point, sharp point detector 324 marks both the "sharp point" flag and the "Bezier point" flag to true for that data point record in data point storage 314 and scans the rest of the data point records for additional sharp points in the manner described above. When sharp point detector 324 finishes identifying all sharp points and marking their corresponding data point records as sharp points and Bezier points in data point storage 324, it signals data point manager 322, which sends the index of the first data point record to extrema detector 340.

When extrema detector 340 receives a pointer from data point manager 322, it identifies all local extrema points and marks them as Bezier points and as a type of local extrema point as described above. In one embodiment, extrema detector 340 checks data points which sharp point detector 324 has not marked as sharp points in order to identify local extrema points as described above. Extrema detector initializes a "vertical slope point" flag for each data point record in data point storage 314 to false. Extrema detector 340 then scans the data point records in the order received, starting with the record corresponding to the pointer it received, to identify whether any data point record corresponds to a local extrema point, as described above, which is not already marked as a sharp point. When extrema detector 340 identifies such a point, it marks the record as a Bezier point. Additionally, when extrema detector 340 identifies the record as corresponding to a local left or right point, it also sets to true the vertical slope point flag for that record in data point storage 314. Once extrema detector 340, finishes marking extrema points as Bezier points and local left and right points as vertical slope points, it signals data point manager 322.

When data point manager 322 receives the signal from extrema detector that all extrema points have been identified and marked, as described above, data point manager 322 sends the index of the first normalized data point record marked as a Bezier point as described above to Bezier point manager 342.

When Bezier point manager 342 receives the index of the first Bezier point, it determines whether the Bezier point at that index, referred to now as "selected Bezier point", as well as the next Bezier point in the order of the indices, referred to now as the "next Bezier point", is a sharp point and sends the indices of selected Bezier point and next Bezier point to either two between points identifier 350 or one between point identifier 356. If the selected Bezier point and next Bezier point are both marked as sharp points in data point storage 314, then Bezier point manager sends the indices of the two Bezier points to two between points identifier 350. Otherwise, Bezier point manager 342 sends the indices of the two Bezier points to one between point identifier 356.

When two between points identifier 350 receives a pair of indices from Bezier point manager 342, it identifies two between points between the selected Bezier point and the next Bezier point as described above. In one embodiment, two between points identifier 350 uses the indices received from Bezier point manager 342 to retrieve the corresponding normalized X coordinates, and normalized Y coordinates of the Bezier points in data point storage 314. Using the normalized coordinates, two between points identifier 350 identifies two between points, in the manner described above, and assigns a t value to each of the four points, in the manner described above. Two between points identifier 350 sends the normalized X coordinates, normalized Y coordinates and t values of all four points (the selected Bezier point, the two between points and next Bezier point) along with the index of selected Bezier point, to sharp equation generator 352.

When sharp equation generator 352 receives the index of the selected Bezier point and the X coordinates, Y coordinates and t values of the selected Bezier point, the two between points and the next Bezier point, it generates eight equations as described above, for example in and around steps 410-418 of FIG. 4, using the X coordinates, Y coordinates and t values of the four points, and sends the system of equations, along with the index of the selected Bezier point to sharp equation solver 354.

When sharp equation solver 354 receives a system of eight equations and the index of a data point from sharp equation generator 352, it solves the system and records the solutions at the data point record at the index it received, which is the index of the first Bezier point in the pair. In one embodiment, sharp equation solver 354 computes the values for the variables $a_x$, $b_x$, $c_x$ and $d_x$, $a_y$, $b_y$, $c_y$ and $d_y$ using conventional linear programming techniques, and stores the values for each variable, which are defined as the parameters of the Bezier point, in data point storage 314 at the data point record having the index which it received from sharp equation generator 352. When sharp equation solver 354 has finished recording the values of $a_x$, $b_x$, $c_x$ and $d_x$, $a_y$, $b_y$, $c_y$ and $d_y$ at the correct data point record in data point storage 314, it sends the indices of the two Bezier points, along with the newly recorded values of $a_x$, $b_x$, $c_x$ and $d_x$, $a_y$, $b_y$, $c_y$ and $d_y$ to accuracy checker 364, described in more detail below.

As noted above, if the selected Bezier point and the next Bezier point are not both sharp, Bezier point manager 342 sends the indices of the two Bezier points (the selected Bezier point and the next Bezier point) to one between point identifier 356. When one between point identifier 356 receives the indices of a pair of adjacent Bezier points, it identifies one between point between the two Bezier points as described above. One between point identifier 356 assigns t values to each of the selected Bezier point, the one between point and the next Bezier point, as described above, and sends the X coordinates, the Y coordinates and t values of these three points, in addition to the index of selected Bezier point, to non-sharp equation generator 360.

When non-sharp equation generator 360 receives the X and Y coordinates and t values from one between point identifier 356, as well as the index of selected Bezier point, it generates a system of eight equations for the given parameters as described above and sends the equations to non-sharp equation solver 362 along with the index of the first Bezier point. In one embodiment, non-sharp equation generator 360 generates two equations each for the selected Bezier point, the between point and the next Bezier point, in the manner described above including steps 410-414 of FIG. 4, for a total of six equations. In one embodiment, non-sharp equation generator 360 then generates two additional equations as described above including steps 434-354. When non-sharp equation generator 360 has finished generating eight equations, it sends the eight equations with the index of selected Bezier point to non-sharp equation solver 362.

When non-sharp equation solver 362 receives a system of eight equations and an index to a Bezier point from non-sharp equation generator 352, it computes the values for $a_x$, $b_x$, $c_x$ and $d_x$, $a_y$, $b_y$, $c_y$ and $d_y$ using conventional linear programming techniques and records the values for $a_x$, $b_x$, $c_x$ and $d_x$, $a_y$, $b_y$, $c_y$ and $d_y$ at the data point record in data point storage 314 corresponding to the index it received from non-sharp equation generator 360. When non-sharp equation solver 362 has finished recording the values of $a_x$, $b_x$, $c_x$ and $d_x$, $a_y$, $b_y$, $c_y$ and $d_y$ at the correct data point record in data point storage 314, it sends the indices of the two Bezier points, along with the newly recorded values of $a_x$, $b_x$, $c_x$ and $d_x$, $a_y$, $b_y$, $c_y$ and $d_y$ to accuracy checker 364.

When accuracy checker 364 receives the indices of two Bezier points, along with newly recorded values of $a_x$, $b_x$, $c_x$, $d_x$, $a_y$, $b_y$, $c_y$ and $d_y$ from either sharp equation solver 354, or non sharp equation solver 362, it determines whether the Bezier curve defined between the selected Bezier point and the next Bezier point is an accurate representation of the normalized data points between the selected Bezier point and the next Bezier point, as described above. In one embodiment, accuracy checker 364 retrieves the normalized data points from data point storage 314 that lie between the index of the selected Bezier point and the next Bezier point and determines the accuracy of the Bezier curve, as described above. If accuracy checker 364 determines that the Bezier curve between the selected Bezier point and the next Bezier point is not accurate, accuracy checker 364 sends the index of the selected Bezier point and the index of the next Bezier point to curve point identifier 366.

When curve point identifier 366 receives the index of the selected Bezier point and the index of the next Bezier point from accuracy checker 364, curve point identifier 366 identifies a midpoint between the selected Bezier point and the next Bezier point, in a manner similar to one between point identifier 356, described above, and curve point identifier 366 marks the normalized date point it has just identified as a curve point as a Bezier point in data point storage 314, as described above. When curve point identifier 366 has finished marking the curve point as a Bezier point in data point storage 314, curve point identifier 366 signals accuracy checker 364 that a new Bezier point has been marked in data point storage 314.

If accuracy checker 364 determines that the Bezier curve between the selected Bezier point and the next Bezier point is accurate, accuracy checker 364 signals Bezier point manager 342 with an indication to use the next Bezier point as the selected Bezier point and to select the following Bezier point following the next Bezier point as the next Bezier point.

If accuracy checker 364 determines that the Bezier curve between the selected Bezier point and the next Bezier point is not accurate as described above, accuracy checker signals Bezier point manager 342 with an indication to use the selected Bezier point as the selected Bezier point and to select the following Bezier point following the selected Bezier point (which will now be the curve point) as the next Bezier point. In such case, Bezier point manager 342 makes such selection and repeats the process described above.

When Bezier point manager 342 receives the signal from accuracy checker 364, if the indication is to use the next Bezier point as the selected Bezier point and to select the following Bezier point following the next Bezier point as the next Bezier point Bezier point manager 342 determines whether the next Bezier point is the last Bezier point and either signals 370 Bezier curves provider or sends another pair of indices to either two between points identifier 350 or one between point identifier 356. In one embodiment, Bezier point manager 342 scans the data point records in data point storage 314 following the selected Bezier point in the order of the indices to attempt to identify a new selected Bezier point and a new next Bezier point. In one embodiment, if two such additional Bezier points cannot be located, then Bezier point manager 342 sends the index of the first Bezier point to Bezier curve provider 370. If the next Bezier point is not the last Bezier point, and two such Bezier points can be located, then Bezier point manager 342 selects the next Bezier point as the new selected Bezier point and the Bezier point following that as the new next Bezier point, and determines whether the newly selected current Bezier point, as well as the newly selected next Bezier point, are sharp points. Bezier point manager 342 then sends the indices of the these two Bezier points to two between points identifier 350 or one between point identifier 356 in the same manner as described above.

When Bezier curve provider 370 receives an index to the first Bezier point in data point storage 314, it provides the Bezier curves which represent the shape originally input via the input device (not shown). In one embodiment, Bezier curve provider 370 retrieves the normalized X coordinates, normalized Y coordinates and the values of $a_x$, $b_x$, $c_x$, $d_x$, $a_y$, $b_y$, $c_y$ and $d_y$, for all Bezier points in data point storage 314, starting at the index provided by Bezier point manager 342. In one embodiment Bezier curve provider 370 provides this information via input/output 306 of communication interface 310. Such information may be provided to a server, which provides such information via a network such as the Internet. In one embodiment, the recipient uses this information to recreate an approximation of the initial input shape using Bezier curves.

What is claimed is:

1. A method of identifying a plurality of Bezier curves from a shape, the shape comprising a plurality of ordered data points, the method comprising:
    identifying each data point in a first subset of the plurality of data points as a first type of data point;
    identifying each data point in a second subset of the plurality of data points as a second type of data point;
    for at least some of the data points in the first subset, identifying a first number of at least one data point between said data point in the first subset, and a next data point in either the first subset or the second subset in the order of the plurality of data points;
    for at least some of the data points in the second subset, identifying a second number, different from the first number, of at least one data point between said data point in the second subset, and a next data point in either the first subset or the second subset in the order of the plurality of data points;
    for each of the at least some of the data points in the first subset and each of the at least some of the data points in the second subset:
        identifying a set of equations responsive to said data point, the next data point in the first or second subset, and the identified at least one data point between such data points;
        solving the equations; and
        identifying at least one of the plurality of Bezier curves responsive to the solved equations and a location of said data point and the next data point in the first or second subset,
    wherein the identifying a set of equations and the solving are performed by at least one processor.

2. The method of claim 1, wherein the first type of data points comprise sharp data points.

3. The method of claim 1, wherein the second type of data points comprise local extrema data points.

4. The method of claim 1, wherein the first type of data points comprise sharp data points and the second type of data points comprise local extrema data points.

5. The method of claim 4, wherein the first number is greater than the second number.

6. The method of claim 5, wherein the first number is two.

7. The method of claim 1, wherein the identifying the first number of at least one data point between said data point in the first subset, and the next data point in either the first subset or the second subset in the order of the plurality of data points is responsive to a number of data points between said data point in the first subset and said next data point.

8. The method of claim 1, wherein the identifying the first number of at least one data point between said data point in the first subset, and the next data point in either the first subset or the second subset in the order of the plurality of data points is responsive to a distance between data points between said data point in the first subset and said next data point.

9. The method of claim 1, additionally comprising normalizing a set of received data points to produce the plurality of data points.

10. The method of claim 9 wherein the normalizing step is responsive to a size of a pixel on a display screen.

11. The method of claim 9, further comprising:
receiving the received set of data points from a communication interface, when the communication interface receives input representing the shape from an input device; and
outputting the identified at least one of the plurality of Bezier curves via the communication interface, the output used to generate an approximation of the shape.

12. A system for identifying a plurality of Bezier curves from a shape, the shape comprising a plurality of ordered data points, the system comprising:
a data point receiver having an input operatively coupled for receiving the plurality of data points, the data point receiver for providing the plurality of ordered data points at an output;
a first identifier having an input coupled to the data point receiver output, the first identifier for identifying at an output each data point in a first subset of a plurality of data points corresponding to the plurality of ordered data points as a first type of data point;
a second identifier having an input coupled to the data point receiver output, the second identifier for identifying at an output each data point in a second subset of the plurality of data points corresponding to the ordered data points as a second type of data point;
a first between point identifier having an input coupled to the first identifier output and second identifier output, the first between point identifier, for at least some of the data points in the first subset, identifying at an output a first number of at least one data point between said data point in the first subset, and
a next data point in either the first subset or the second subset in the order of the plurality of data points;
a second between point identifier having an input coupled to the first identifier output and second identifier output, the second between point identifier, for at least some of the data points in the second subset, identifying a second number, different from the first number, of at least one data point between said data point in the second subset, and a next data point in either the first subset or the second subset in the order of the plurality of data points;
a first equation identifier having an input coupled to the first between point identifier output and the first identifier, the first equation identifier for, for each of the at least some of the data points in the first subset, identifying and providing at an output, a first set of equations responsive to said data point, the next data point in the first subset, and the identified at least one data point between such data points;
a first equation solver having an input coupled to the first equation identifier, the first equation solver for solving each said first set of equations and providing a solution and coordinates of said data point and said next data point at an output;
a second equation identifier having an input coupled to the second between point identifier output and the second identifier, the second equation identifier for, for each of the at least some of the data points in the second subset, identifying and providing at an output, a second set of equations responsive to said data point, the next data point in the second subset, and the identified at least one data point between such data points;
a second equation solver having an input coupled to the second equation identifier, the second equation solver for solving each said second set of equations and providing a solution and coordinates of said data point and said next data point at an output; and
a Bezier curve identifier having an input coupled to the first equation solver output and the second equation solver output, the Bezier curve identifier for, for each solution and coordinates of said data point and said next data point, identifying at least one of the plurality of Bezier curves responsive to the solution and said coordinates.

13. The system of claim 12, wherein the first type of data points comprise sharp data points.

14. The system of claim 12, wherein the second type of data points comprise local extrema data points.

15. The system of claim 12, wherein the first type of data points comprise sharp data points and the second type of data points comprise local extrema data points.

16. The system of claim 15, wherein the first number is greater than the second number.

17. The system of claim 16, wherein the first number is two.

18. The system of claim 12, wherein the identifying the first number of at least one data point between said data point in the first subset, and the next data point in either the first subset or the second subset in the order of the plurality of data points is responsive to a number of data points between said data point in the first subset and said next data point.

19. The system of claim 12, wherein the identifying the first number of at least one data point between said data point in the first subset, and the next data point in either the first subset or the second subset in the order of the plurality of data points is responsive to a distance between data points between said data point in the first subset and said next data point.

20. The system of claim 12:
additionally comprising a normalizer having an input coupled to the data point receiver output, the normalizer for normalizing and providing at an output, the plurality of ordered data points to produce the plurality of data points corresponding to the plurality of ordered data points; and
wherein the first identifier and the second identifier are coupled to the normalizer output.

21. The system of claim 20 wherein the normalizer normalizes the plurality of ordered data points responsive to a size of a pixel on a display screen.

22. A computer program product comprising a computer useable medium having computer readable program code embodied therein for identifying a plurality of Bezier curves from a shape, the shape comprising a plurality of ordered data points, the computer program product comprising computer readable program code devices configured to cause a computer system to:
identify each data point in a first subset of the plurality of data points as a first type of data point;
identify each data point in a second subset of the plurality of data points as a second type of data point;
for at least some of the data points in the first subset, identify a first number of at least one data point between said data point in the first subset, and a next data point in either the first subset or the second subset in the order of the plurality of data points;
for at least some of the data points in the second subset, identify a second number, different from the first number, of at least one data point between said data point in the second subset, and a next data point in either the first subset or the second subset in the order of the plurality of data points;
for each of the at least some of the data points in the first subset and each of the at least some of the data points in the second subset:

identify a set of equations responsive to said data point, the next data point in the first or second subset, and the identified at least one data point between such data points;

solve the equations; and identify at least one of the plurality of Bezier curves responsive to the solved equations and a location of said data point and the next data point in the first or second subset.

23. The computer program product of claim 22, wherein the first type of data points comprise sharp data points.

24. The computer program product of claim 22, wherein the second type of data points comprise local extrema data points.

25. The computer program product of claim 22, wherein the first type of data points comprise sharp data points and the second type of data points comprise local extrema data points.

26. The computer program product of claim 25, wherein the first number is greater than the second number.

27. The computer program product of claim 26, wherein the first number is two.

28. The computer program product of claim 22, wherein the computer readable program code devices configured to cause the computer system to identify the first number of at least one data point between said data point in the first subset, and the next data point in either the first subset or the second subset in the order of the plurality of data points are responsive to a number of data points between said data point in the first subset and said next data point.

29. The computer program product of claim 22, wherein the computer readable program code devices configured to cause the computer system to identify the first number of at least one data point between said data point in the first subset, and the next data point in either the first subset or the second subset in the order of the plurality of data points are responsive to a distance between data points between said data point in the first subset and said next data point.

30. The computer program product of claim 22, additionally comprising computer readable program code devices configured to cause the computer system to normalize a set of received data points to produce the plurality of data points.

31. The computer program product of claim 30 wherein the computer readable program code devices configured to cause the computer system to normalize are responsive to a size of a pixel on a display screen.

\* \* \* \* \*

UNITED STATES PATENT AND TRADEMARK OFFICE
CERTIFICATE OF CORRECTION

| | | |
|---|---|---|
| PATENT NO. | : 7,623,998 B1 | Page 1 of 1 |
| APPLICATION NO. | : 11/429381 | |
| DATED | : November 24, 2009 | |
| INVENTOR(S) | : Yu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 826 days.

Signed and Sealed this

Ninth Day of November, 2010

David J. Kappos
*Director of the United States Patent and Trademark Office*